H. E. ELY, Jr.
APPARATUS FOR MEASURING DISTANCES.
APPLICATION FILED JUNE 24, 1918.

1,386,610.

Patented Aug. 9, 1921.
2 SHEETS—SHEET 1.

Inventor
HANSON E. ELY Jr

Witness

By Blackwood Bros.,
Attorneys

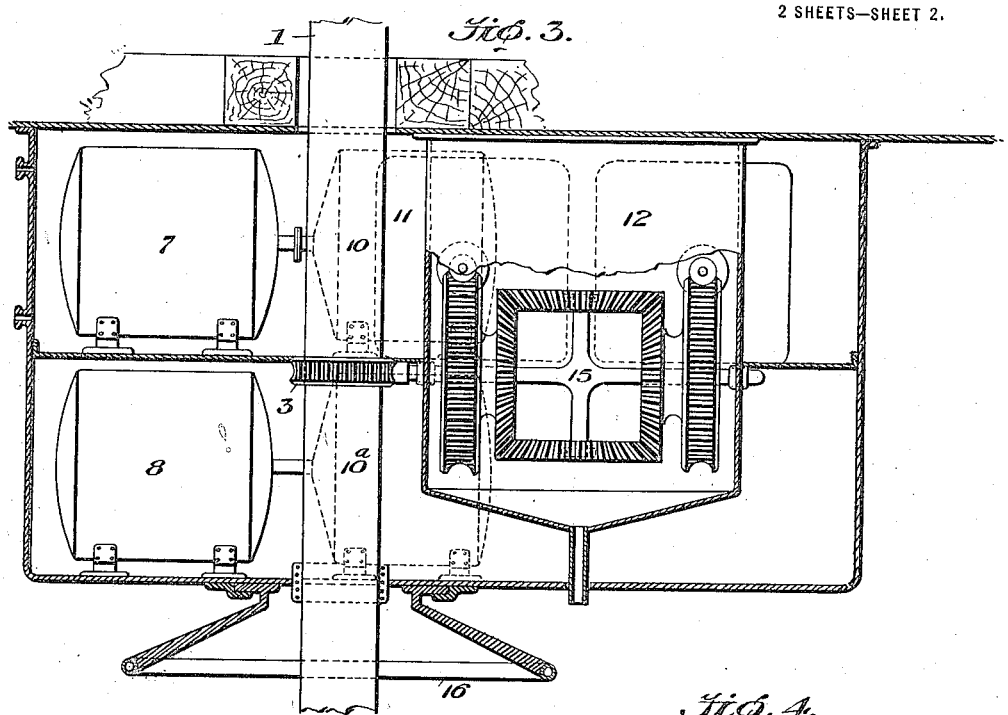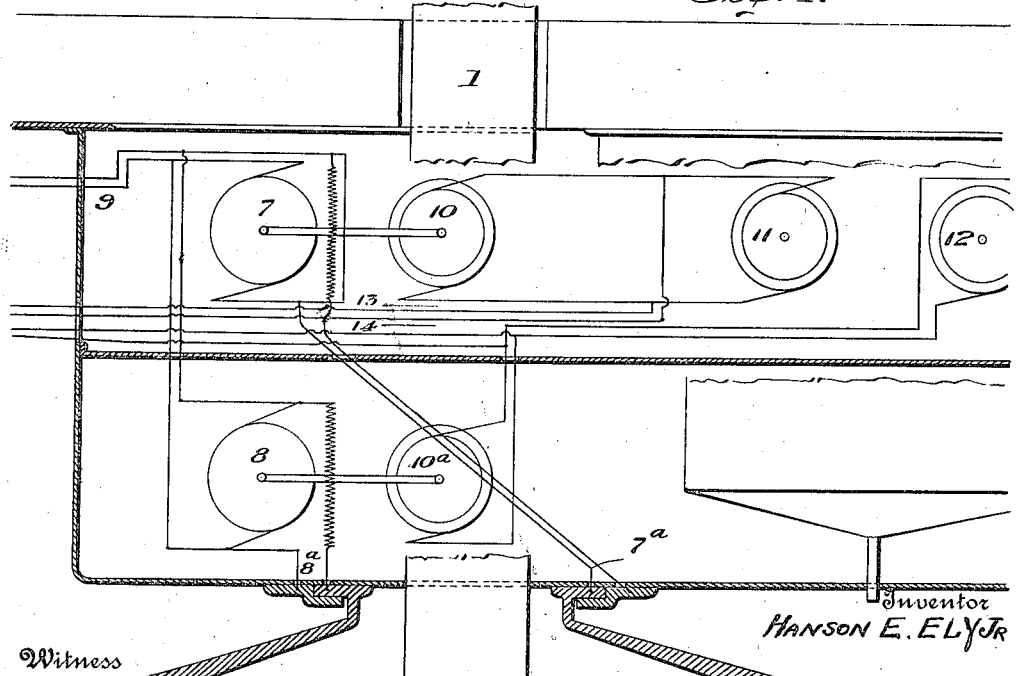

UNITED STATES PATENT OFFICE.

HANSON E. ELY, JR., OF THE UNITED STATES NAVY.

APPARATUS FOR MEASURING DISTANCES.

1,386,610.  Specification of Letters Patent.  Patented Aug. 9, 1921.

Application filed June 24, 1918. Serial No. 241,485.

*To all whom it may concern:*

Be it known that I, Lieut. HANSON E. ELY, Jr., United States Navy, residing in the United States, a citizen of the United States, have invented certain new and useful Improvements in Apparatus for Measuring Distances; and I do hereby declare the following to be a full, clear, and exact description of the invention, such as will enable others skilled in the art to which it pertains to make and use the same.

My invention relates to an apparatus for measuring distances, and more especially to a range finder for use in connection with war ships, fortifications, army field work and other places where it is desired to accurately measure and record distances.

The object of the invention primarily is to determine the range of a distant object in conducting modern warfare.

A further object is to provide an apparatus for measuring distances and also for recording the same.

Assuming a ship of war having a telescope or periscope mounted in the bow and one in the stern, the distance between which is known, both telescopes being trained on the same point on a ship, target or other object, the angle between their lines of sight when applied to the bearing becomes the measure of the range.

A further object is the measurement of the above angle with the greatest degree of accuracy under all conditions which may arise.

A still further object is to provide an apparatus for the purpose stated which is simple, inexpensive and durable in construction, exceedingly easy to operate, the liability to get out of order of which is reduced to a minimum degree and which is reliable and effective in results produced.

One of the principal advantages that my invention has over previous types of long base range finders is that almost perfect coöperation between the operators is assured; first, because, with the forward operator constantly on, the only requirement from the aft operator is that he make the comparatively minor adjustments due to the actual change in the range or bearing; secondly, because, if the forward operator is thrown off, the aft operator knows it at once and consequently will not make any useless attempts to get a range, as the last range, moreover, is still approximately accurate and available for use.

The invention consists in the several features and in the construction, combination and arrangement of features as more fully hereinafter described and claimed.

Referring to the drawings:

Fig. 3 is an enlarged partly sectional view of the operative mechanism of the forward telescope;

Fig. 4 is an enlarged partly sectional view showing the wiring for the forward telescope;

Figure 1:
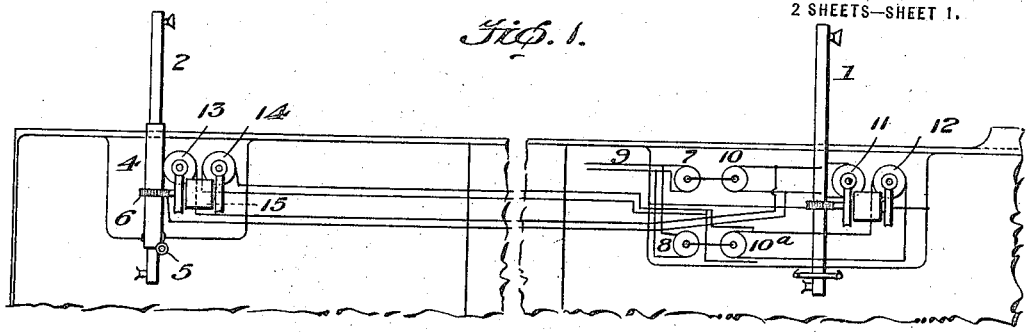
Figure 1 is a diagrammatic view illustrating an apparatus constituting one practical embodiment of my invention.
Figure 2:
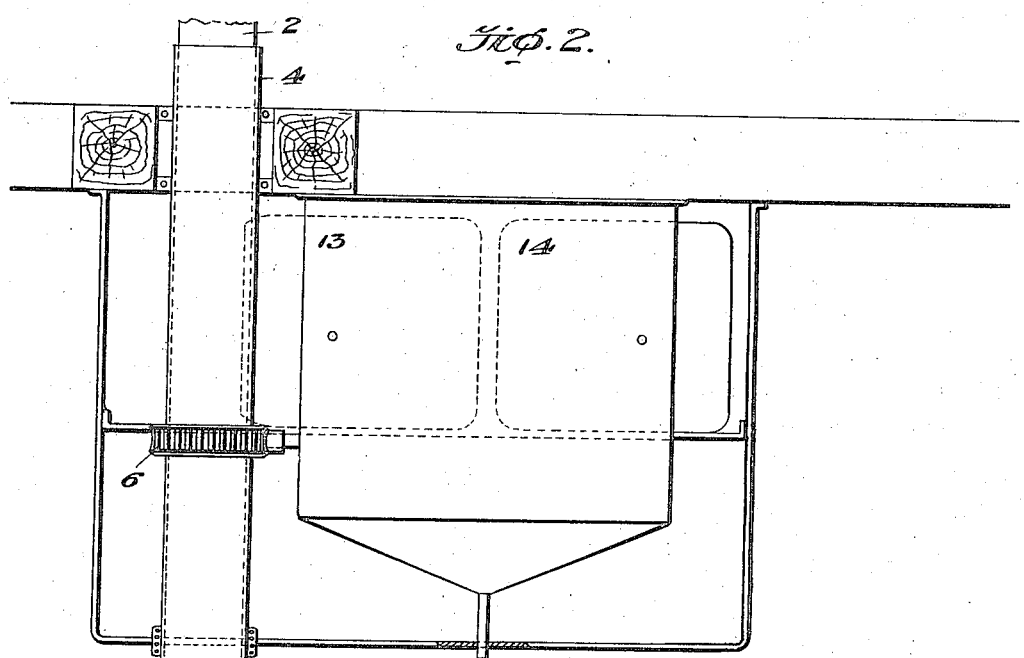
Fig. 2 is an enlarged sectional view of the operative mechanism of one of the telescopes.
Figure 5:
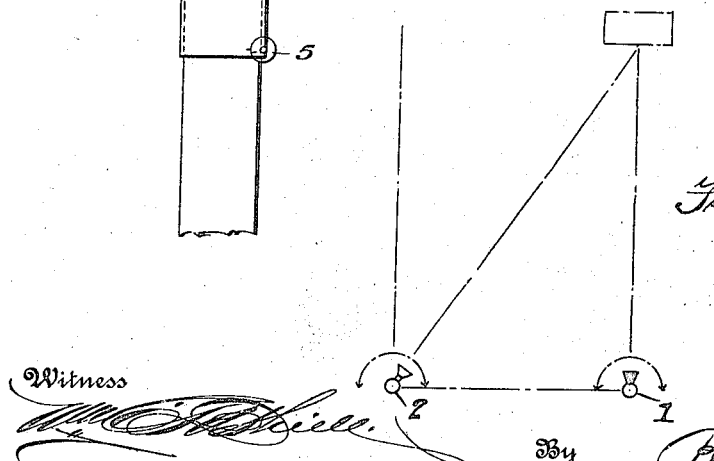
Fig. 5 is a diagrammatic view showing the positions of the telescopes in determining range.

In the drawings, in which similar reference characters denote similar parts throughout the several views, 1 and 2 represent two telescopes, preferably of the periscopic type, and which should be of exceedingly high power, at least 30 diameters, and the wires should be as small as it is possible to make them.

I have designated the telescopes as forward and aft telescopes respectively.

The forward telescope 1 is mounted rigidly on a turntable 3 and the aft telescope 2 is mounted on the shaft 4 of a secondary training gear 5 in the form of a micrometer screw which in turn is secured to a turntable 6.

7 and 8 are two direct current shunt motors connected to the ship's mains 9. Each motor drives an alternator 10, the leads of which go to the two stations, these leads connect with synchronous motors 11, 12, 13 and 14, and each pair of these motors 11 and 12, for example, drives an epicyclic train 15, the resultant motion of which is zero when the motors are run at same speeds. The field 7ª, however, being variable and under control of the operator of the forward telescope, that operator can cause it to speed up or slow down, as he desires, and as 7 speeds up or slows down the speed of the alternations from 10 varies, and the speed of the two motors 11 and 13 in step with the alternations of the alternator 10 also varies through being in synchronism, and their relative speed does not change. Thus as the speed of 11 and 13 changes with relation to the speed of 12 and 14 similar resultant motion is produced in the epicyclic trains and the turntables move in any direction and at any rate of speed within reasonable limits that is required.

The only possible chance for inaccuracy is in lost motion, but, as this is always to be in the same direction on both tables, its elimination is not difficult.

The operation is as follows:

Let us suppose that the apparatus is installed on board a ship of war, with the two telescopes and stations located one on the bow and the other on the stern of the ship. The motors, being supplied with squirrel cage windings to enable them to start with the load torque, are started and the telescopes placed on their zero marks, predetermined and locked, which makes them absolutely parallel. The forward or main control operator of telescope 1 now moves the handle 16 of his controller, so weakening the field of motor 7 and strengthening that of motor 8, which causes the motor 7 to speed up and motor 8 to slow down, and results in an increase in frequency in alternator 10 and a lessening or decrease in alternator 10ª. This change causes equal increases in the speed of 11 and 13 and correspondingly equal decrease in speed of 12 and 14 and the same amount of movement in each of the two telescopes 1 and 2.

The main control operator thus jockeys his telescope 1, now speeding 7 and slowing up 8 and now reversing the operation until he is on the predetermined spot on the target.

The main control operator now flashes a light to the other or secondary control station to signify that he is on the target, and as long as this light continues to show the operator at the aft or secondary control station or telescope 2 knows his co-worker to be on the predetermined spot.

The sole commission of the aft operator of telescope 2 is to keep it bearing on the predetermined point, and thence to read the angle of displacement from his parallel position to telescope 1. This angle is telephoned to the central station and is applied to a scale, curve or table in which the bearing of the target and the submitted subtended angle are the coördinates, and the range determined.

I do not wish to be understood as limiting myself to the specific details of construction and arrangement as herein described and illustrated, as it is manifest that variations and modifications may be made in the features of construction and arrangement in the adaptation of the device to the various conditions of use without departing from the spirit and scope of my invention and improvements. I, therefore, reserve the right to all such variations and modifications as properly fall within the scope of my invention and the terms of the following claims.

What I claim is:

1. In an apparatus for measuring distances, a plurality of pivotally mounted sighting instruments adapted to be directed toward a target, means for connecting said instruments for moving them on their own axes in parallelism and means for moving one of said instruments out of parallelism with the other.

2. In an apparatus for measuring distances, a plurality of pivotally mounted sighting instruments adapted to be directed toward a target, means for connecting the said instruments for moving them on their own axes in parallelism and means for moving one of said instruments out of parallelism independently of the other and means for registering the degree of said movement.

3. In an apparatus for measuring distances, a plurality of pivotally mounted sighting instruments adapted to be directed toward a target, means for connecting the said instruments for simultaneously moving them on their own axes in parallelism, means for pivotally adjusting one of said instruments on its own axis, independently of the other instrument, means for registering the degree of such adjustment and an axially pivoted mount for one of said instruments.

4. In an apparatus for measuring distances, a plurality of pivotally mounted periscopes adapted to be directed toward a target, one of said periscopes designated as a controlling periscope to point directly at the target and adjustable independently of the other periscope; electrical means for connecting and operating the said periscopes in parallelism and a pivoted mount within which the secondary periscope is axially mounted, said operating means indirectly connected to the secondary periscope through said mount.

5. In an apparatus for measuring distances, a plurality of pivotally mounted periscopes adapted to be directed toward a target, one of said periscopes designated as a controlling periscope to point directly at the target and provided with a gear, means for connecting and moving the other or secondary periscope in parallelism with the controlling periscope, said secondary periscope provided with a sleeve thereon having a gear, electrically operated means indirectly connected to the gear of the secondary periscope by means of the said sleeve mounted thereon and directly connected to the gear of the controlling periscope, and means for registering the degree of adjustment of the second mentioned periscope.

6. In an apparatus for measuring distances, a plurality of pivotally mounted periscopes adapted to be directed toward a target, one of said periscopes designated as a controlling periscope to point directly at the target and provided with a gear thereon, electrically operated means for connecting and moving the other or secondary periscope, said secondary periscope provided with a sleeve having a gear mounted thereon, said electrically operated means connected to the gear of the controlling periscope, and the sleeve of the secondary periscope, and means for registering the adjustment of the secondary periscope.

In testimony whereof, I have affixed my signature.

HANSON E. ELY, Jr.